(12) United States Patent
Lee et al.

(10) Patent No.: US 8,175,182 B2
(45) Date of Patent: May 8, 2012

(54) METHOD FOR TRANSMITTING DATA USING PHASE SHIFT BASED PRECODING AND TRANSCEIVER SUPPORTING THE SAME

(75) Inventors: Moon Il Lee, Anyang-si (KR); Bin Chul Ihm, Anyang-si (KR); Wook Bong Lee, Anyang-si (KR); Hyun Soo Ko, Anyang-si (KR); Jae Won Chang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 12/312,255

(22) PCT Filed: Nov. 2, 2007

(86) PCT No.: PCT/KR2007/005530
§ 371 (c)(1),
(2), (4) Date: May 1, 2009

(87) PCT Pub. No.: WO2008/054178
PCT Pub. Date: May 8, 2008

(65) Prior Publication Data
US 2010/0061482 A1    Mar. 11, 2010

Related U.S. Application Data

(60) Provisional application No. 60/864,126, filed on Nov. 2, 2006.

(30) Foreign Application Priority Data

Apr. 9, 2007 (KR) .......................... 10-2007-0034739

(51) Int. Cl.
H04L 1/02 (2006.01)
(52) U.S. Cl. ......................................................... 375/267
(58) Field of Classification Search .................. 375/299, 375/296, 285, 260, 295; 370/203, 206
See application file for complete search history.

(56) References Cited

U.S. PATENT DOCUMENTS 7,433,419 B2 * 10/2008 Yun et al. ...................... 375/296
7,711,066 B2 * 5/2010 Jiang et al. .................... 375/296

FOREIGN PATENT DOCUMENTS

EP    1 505 741    2/2005
EP    1 655 874    5/2006

* cited by examiner

*Primary Examiner* — Khai Tran
(74) *Attorney, Agent, or Firm* — McKenna Long & Aldridge LLP (57) ABSTRACT

A method of transmitting data using cyclic delay in a multi-antenna system using a plurality of subcarriers and a transceiver supporting the same are disclosed. More particularly, a method of selecting a matrix (second matrix) for transforming a precoding matrix (first matrix) into a unitary matrix from a codebook by a prescribed reference is disclosed. An index for selecting the second matrix is calculated by a prescribed modulo operation in an open loop system or delivered as feedback information in a closed loop system. Diversity can be obtained by switching each column of the selected second matrix in accordance with time. In a multi-user system, a single second matrix can be determined by combining columns of the second matrix selected by each user.

10 Claims, 7 Drawing Sheets

METHOD FOR TRANSMITTING DATA USING PHASE SHIFT BASED PRECODING AND TRANSCEIVER SUPPORTING THE SAME

This application is a national stage entry of International Application No. PCT/KR2007/005530, filed Nov. 2, 2007, and claims the benefit of U.S. application Ser. No. 60/864,126, filed Nov. 2, 2006 and Korean Application No. 10-2007-0034739, filed on Apr. 9, 2007, each of which are hereby incorporated by reference in their entireties for all purposes as if fully set forth herein.

TECHNICAL FIELD

The present invention relates to a method of transmitting data using Phase Shift Based Precoding in a multi-antenna system using a plurality of subcarriers and a transceiver supporting the same.

BACKGROUND ART

Recently, the demand for a wireless communication service has rapidly risen owing to the generalization of information communication services, the advent of various multimedia services, and the appearance of high-quality services. To actively cope with the demand, a size of a communication system should be raised in the first place. In order to raise a communication size in a wireless communication environment, it is able to consider a method of finding a new available frequency band or a method of raising efficiency for limited resources. For the latter method, a spatial domain for resource utilization is additionally secured to obtain a diversity gain in a manner of providing a plurality of antennas to a transmitter and receiver or a transmission size of capacity is raised in a manner of transmitting data in parallel through each antenna. Such a technology is called a multi-antenna transmitting/receiving technique to which many efforts have been actively made to research and develop.

In the multi-antenna transmitting/receiving technique, a general structure of a multiple-input multiple-output (MIMO) system using OFDM (orthogonal frequency division multiplexing) is explained with reference to FIG. 1 as follows.

In a transmitting end, a channel encoder 101 reduces influence caused by channel or noise in a manner of attaching a redundant bit to a transmission data bit. A mapper 103 transforms data bit information into data symbol information. A serial-to-parallel converter 105 parallelizes a data symbol to carry on a plurality of subcarriers. A multi-antenna encoder 107 transforms a parallelized data symbol into a spatiotemporal signal.

In a receiving end, a multi-antenna decoder 109, a parallel-to-serial converter 111, a demapper 113 and a channel decoder 115 plays functions reverse to those of the multi-antenna encoder 107, the serial-to-parallel converter 105, the mapper 103 and the channel encoder 101 in the transmitting end, respectively.

Various techniques are required for a MIMO-OFDM system to enhance data transmission reliability. As a scheme for increasing a spatial diversity gain, there is space-time code (STC), cyclic delay diversity (CDD) or the like. As a scheme for increasing a signal to noise ratio (SNR), there is beamforming (BF), precoding or the like. In this case, the space-time code or the cyclic delay diversity scheme is normally employed to provide robustness for an open-loop system in which feedback information is not available at the transmitting end due to fast time update of the channel. In other hand, the beamforming or the precoding is normally employed in a closed-loop system in order to maximize a signal to noise ratio by using feedback information which includes a spatial channel property.

As a scheme for increasing a spatial diversity gain and a scheme for increasing a signal to noise ratio among the above-mentioned schemes, cyclic delay diversity and precoding are explained in detail as follows.

Figure 2:
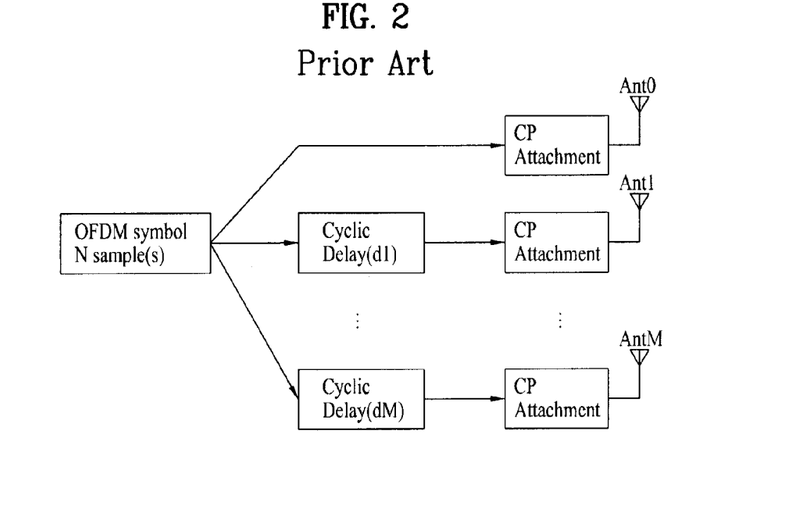
FIG. 2 is a block diagram of a transmitting end of a multi-antenna system using a cyclic delay diversity scheme.

First of all, in the cyclic delay scheme, a receiving end obtains a frequency diversity gain in a manner that every antenna transmits a signal differing in delay or size in transmitting an OFDM signal in a system provided with a plurality of transmitting antennas. FIG. 2 shows a configuration of a multi-antenna transmitter using a cyclic diversity scheme.

OFDM symbol is transmitted through each antennas and different value of cyclic delay is applied across the transmit antennas. A cyclic prefix (CP) is attached thereto to prevent inter-channel interference. The corresponding signal is then transmitted to a receiving end. In doing so, a data sequence delivered from a first antenna is intactly transmitted to the receiving end. Yet, data sequences delivered from the other antennas are transmitted in a manner of being cyclically delayed by predetermined bits rather than a previous antenna.

Figure 3:
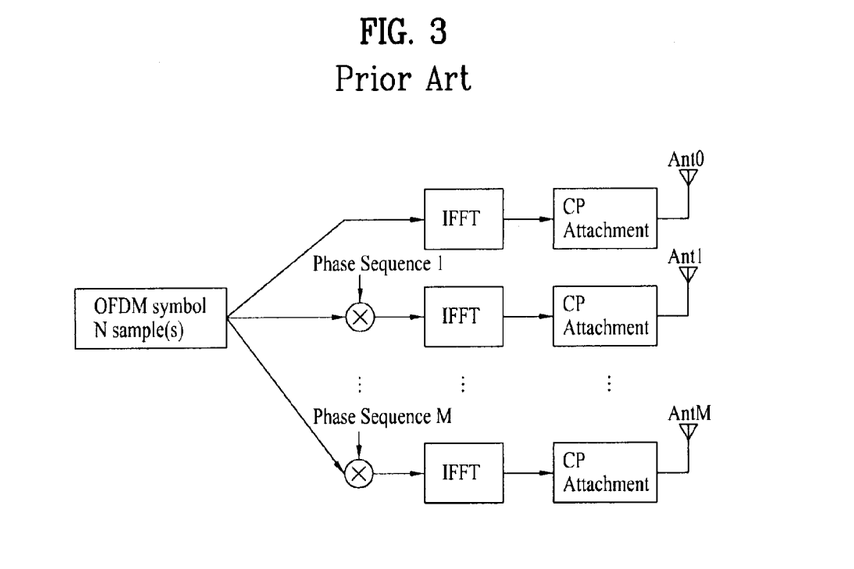
FIG. 3 is a block diagram of a transmitting end of a multi-antenna system using a phase shift diversity scheme.

Meanwhile, if the cyclic delay diversity scheme is implemented on a frequency domain, the cyclic delay can be represented as a multiplication of a phase sequence. In particular, referring to FIG. 3, each data sequence on a frequency domain is multiplied by a prescribed phase sequence (phase sequence 1~phase sequence M) set different for each antenna, fast inverse Fourier transform (IFFT) is performed thereon, and a corresponding result is then transmitted to a receiving end. This is called a phase shift diversity scheme.

The phase shift diversity scheme can artificially introduce frequency selectivity into a flat fading channel by increasing delay spread of the channel at the receiving end. Thereby, a frequency diversity gain or a frequency scheduling gain can be obtained.

The precoding scheme includes a codebook based precoding scheme used for a case that feedback information is finite in a closed loop system or a scheme for quantizing to feed back channel information. The codebook based precoding is a scheme for obtaining a signal to noise ratio (SNR) gain in a manner of feeding back a precoding matrix index already known to transmitting and receiving ends to the transmitting end.

Figure 4:
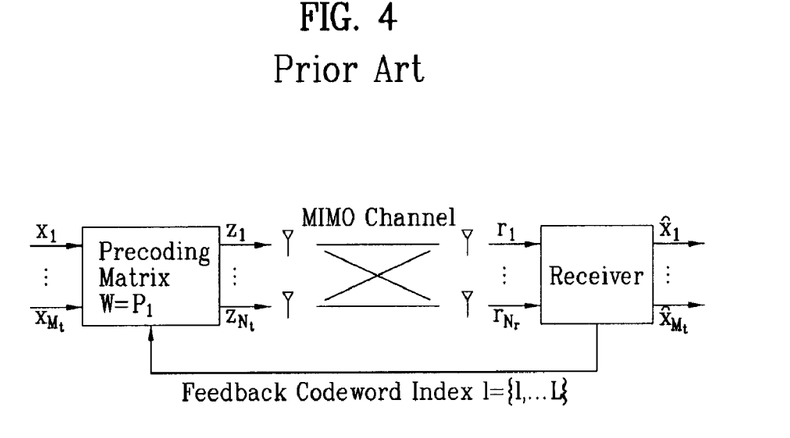
FIG. 4 is a block diagram of transmitting and receiving ends of a multi-antenna system using a precoding scheme.

FIG. 4 is a block diagram of transmitting and receiving ends of a multi-antenna system using the codebook based precoding according to a related art.

Referring to FIG. 4, each of transmitting and receiving ends has predefined finite precoding matrixes ($P_1$~$P_L$). The receiving end feeds back an preferred or optimal precoding matrix index (1) to the transmitting end using channel information. The transmitting end applies a precoding matrix corresponding to the fed-back index to transmission data ($x_I$~$X_{Mt}$). For reference, Table 1 exemplarily shows a codebook applicable to a case that 3-bit feedback information is used by IEEE 802.16e system supporting a spatial multiplexing rate 2 with two transmitting antennas.

TABLE 1

| Matrix index (binary) | Column1 | Column2 |
|---|---|---|
| 000 | 1<br>0 | 0<br>1 |
| 001 | 0.7940<br>−0.5801 + j0.1818 | −0.5801 − j0.1818<br>−0.7940 |
| 010 | 0.7940<br>0.0576 + j0.6051 | 0.0576 − j0.6051<br>−0.7940 |
| 011 | 0.7941<br>−0.2978 − j0.5298 | −0.2978 + j0.5298<br>−0.7941 |
| 100 | 0.7941<br>0.6038 + j0.0689 | 0.6038 − j0.0689<br>−0.7941 |
| 101 | 0.3289<br>0.6614 + j0.6740 | 0.6614 − j0.6740<br>−0.3289 |
| 110 | 0.5112<br>0.4754 − j0.7160 | 0.4754 + j0.7160<br>−0.5112 |
| 111 | 0.3289<br>−0.8779 − j0.3481 | −0.8779 + j0.3481<br>−0.3289 |

DISCLOSURE OF THE INVENTION

Technical Problem

The above-explained phase shift diversity scheme is also advantageous in obtaining a frequency selectivity diversity gain in an open loop and a frequency scheduling gain in a closed loop. Therefore, the phase shift diversity scheme has been studied and investigated so far.

However, the conventional phase shift diversity scheme restricts the spatial multiplexing rate as 1, thus maximum data rate is also restricted. Thus, it could not achieve full system throughput even though higher data rate can be obtained in a channel.

Since the above-explained codebook based precoding scheme is able to use a high spatial multiplexing rate by requiring small-size feedback information (index information), it is advantageous in enabling effective data transmission.

However, the codebook based precoding scheme requires feedback information indicating a specifics precoding vector or matrix which is properly chosen at the receiver by considering current channel status. However, if mobile speed gets higher the channel status can be rapidly changed. In other words, feedback information is not the optimal choice anymore due to fast channel update in high mobile speed. Therefore, it is not appropriate to be used under the highly time varying channel.

Technical Solution

Accordingly, the present invention is directed to a method of transmitting data using Phase Shift Based Precoding scheme in a multi-antenna system using a plurality of subcarriers and transceiver supporting the same that substantially obviates one or more of the problems due to limitations and disadvantages of the related art.

An object of the present invention is to provide a phase shift based precoding scheme, by which disadvantages of the related art cyclic delay diversity, phase shift diversity and precoding schemes can be compensated.

Another object of the present invention is to select a unitary matrix usable in a phase shift based precoding scheme according to various references.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting data using phase shift based precoding, in which a plurality of subcarriers are used in a multi-antenna system, according to the present invention includes determining a first matrix of a diagonal matrix for a phase shift as a part of a phase shift based precoding matrix, determining a second matrix from a codebook storing at least one unitary matrix as another part of the phase shift based precoding matrix, determining the phase shift based precoding matrix by multiplying the first matrix and the second matrix together, and performing precoding by multiplying the phase shift based precoding matrix by a symbol of a corresponding one of the subcarriers.

To further achieve these and other advantages and in accordance with the purpose of the present invention, a transceiver, which performs phase shift based precoding and transmits data in a multi-antenna system using a plurality of subcarriers, according to the present invention includes a precoding matrix determining module determining a first matrix of a diagonal matrix for a phase shift as a part of a phase shift based precoding matrix, determining a second matrix from a codebook storing at least one unitary matrix as another part of the phase shift based precoding matrix, and determining the phase shift based precoding matrix by multiplying the first matrix and the second matrix together, and a precoding module performing precoding by multiplying the phase shift based precoding matrix by a symbol of a corresponding one of the subcarriers.

In the above two embodiments of the present invention, the second matrix is selected by performing a modulo operation using an index k of the corresponding resource index or subcarrier with a codebook size N.

Preferably, if a multiplexing rate of the second matrix is equal to or greater than 2, each column of the second matrix is switched by a prescribed time or subcarrier unit.

Preferably, a prescribed phase angle is added to the first matrix by the prescribed time or subcarrier unit.

Preferably, the second matrix is selected based on information fed back from a plurality of receiving ends.

More preferably, the fed-back information includes information about a matrix index and a column vector within the codebook.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention enable efficient communication through a phase shift based precoding scheme that compensates for disadvantages of the related art cyclic delay diversity, phase shift diversity and precoding scheme.

In particular, the present invention enables a unitary matrix constructing a phase shift based precoding scheme to be selected or transformed in accordance with various references including a communication situation and the like, thereby enabling optimized communication.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Mode for Invention

Reference will now be made in detail to the preferred embodiments of the present invention, examples of which are illustrated in the accompanying drawings.

<First Embodiment> Phase Shift Based Precoding

Generation of Phase Shift Based Precoding Matrix

Figure 5:
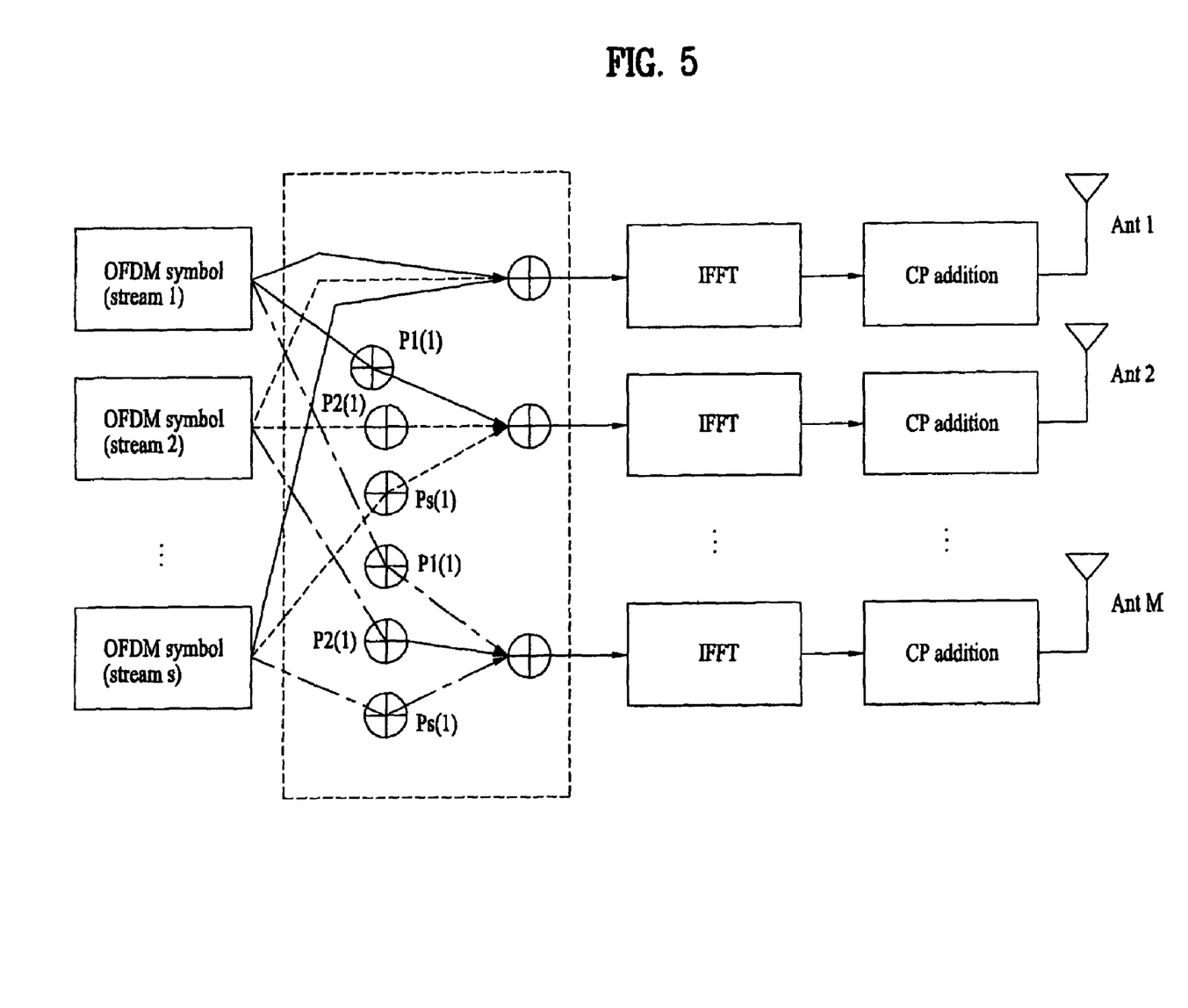
FIG. 5 is a block diagram of a transceiver for performing phase shift based precoding scheme.

FIG. 5 is a block diagram of a transceiver for performing phase shift based precoding.

In a phase shift based precoding method, every stream to be transmitted is transmitted via entire antenna in a manner of being multiplied by sequence having a different phase.

Generally, if a phase sequence is generated using a small cyclic delay value, frequency selectivity is generated from a channel in a receiver and a size of channel increases or decreases in accordance with a frequency domain.

Referring to FIG. 5, a transmitter secures a scheduling gain in a manner of assigning a user terminal to a part having an enhanced channel status due to an increased frequency on a frequency band fluctuating in accordance with a relatively small cyclic delay value. In this case, a phase shift based precoding matrix is used to apply a uniformly increasing or decreasing cyclic delay value to each antenna.

A phase shift based precoding matrix (P) can be represented as follows.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ [Formula 1]

In Formula 1, $w_{i,j}^k$ ($i=1, \ldots, N_t$, $j=1, \ldots, R$) indicates a complex weight determined by a subcarrier index or a specific frequency band index k, '$N_t$' indicates a number of transmitting antennas, and 'R' indicates a spatial multiplexing rate.

In this case, the complex weight can have a value varying in accordance with an OFDM symbol by which an antenna is multiplied and an index of a corresponding subcarrier. And, the complex weight can be determined in accordance with at least one of a channel status and a presence or non-presence of feedback information.

Meanwhile, the phase shift based precoding matrix (P) shown in Formula 1 is preferably designed into a unitary matrix to reduce loss of a channel capacity in a multi-antenna system. In this case, a channel capacity of a multi-antenna open loop system is represented as the following formula to look into a condition for the unitary matrix configuration.

$$Cu(H) = \log_2\left(\det\left(I_{N_t} + \frac{SNR}{N}HH^H\right)\right)$$ [Formula 2]

In Formula 2, 'H' indicates an $N_r \times N_t$ multi-antenna channel matrix, '$N_t$' indicates a number of transmitting antennas, and '$N_r$' indicates a number of receiving antennas. A result from applying the phase shift based precoding matrix P to Formula 2 is shown in Formula 3.

$$C_{precoding} = \log_2\left(\det\left(I_{N_t} + \frac{SNR}{N}HPP^H H^H\right)\right)$$ [Formula 3]

In Formula 3, since $PP^H$ should be an identity matrix to prevent a loss of a channel capacity, the phase shift based precoding matrix P should correspond to a unitary matrix that satisfies the following conditions.

$$PP^H = I_N$$ [Formula 4]

In order for the phase shift based precoding matrix P to become a unitary matrix, the following two kinds of conditions, i.e., a power restriction condition and an orthogonality restriction condition. The power restriction is to enable a sum of squared column elements per a column constructing a matrix to be 1. And, the orthogonality restriction is to provide an orthogonal characteristic between columns. The conditions are represented as the following formulas.

$$|w_{1,1}^k|^2 + |w_{2,1}^k|^2 + \ldots + |w_{N_t,1}^k|^2 = 1,$$
$$|w_{1,2}^k|^2 + |w_{2,2}^k|^2 + \ldots + |w_{N_t,2}^k|^2 = 1,$$
$$\vdots$$
$$|w_{1,R}^k|^2 + |w_{2,R}^k|^2 + \ldots + |w_{N_t,R}^k|^2 = 1$$ [Formula 5]

-continued $$w_{1,1}^{k*}w_{1,2}^{k*} + w_{2,1}^{k*}w_{2,2}^{k*} + \ldots + w_{N_t,1}^{k*}w_{N_t,2}^{k*} = 0,$$
$$w_{1,1}^{k*}w_{1,3}^{k*} + w_{2,1}^{k*}w_{2,3}^{k*} + \ldots + w_{N_t,1}^{k*}w_{N_t,3}^{k*} = 0,$$
$$\vdots$$
$$w_{1,1}^{k*}w_{1,R}^{k*} + w_{2,1}^{k*}w_{2,R}^{k*} + \ldots + w_{N_t,1}^{k*}w_{N_t,R}^{k*} = 0$$

[Formula 6]

According to one embodiment of the present invention, a generalized formula of 2×2 phase shift based precoding matrix is proposed. And, formulas to satisfy the above two kinds of conditions are taken into consideration as follows. Formula 7 shows a general formula of a phase shift based precoding matrix having two transmitting antennas with a spatial multiplexing rate 2.

$$P_{2\times2}^k = \begin{pmatrix} \alpha_1 e^{jk\theta_1} & \beta_1 e^{jk\theta_2} \\ \beta_1 e^{jk\theta_3} & \alpha_2 e^{jk\theta_4} \end{pmatrix}$$

[Formula 7]

In Formula 7, $\alpha_i$ or $\beta_i$ (i=1, 2) is a real number, $\theta_i$ (i=1, 2, 3, 4) has a phase value, and k indicates a subcarrier index of OFDM symbol. In order to implement the precoding matrix into a unitary matrix, a power restriction condition shown in Formula 8 and an orthogonality restriction condition shown in Formula 9 should be met.

$$|\alpha_1 e^{jk\theta_1}|^2 + |\beta_2 e^{jk\theta_3}|^2 = 1, \; |\alpha_2 e^{jk\theta_4}|^2 + |\beta_1 e^{jk\theta_2}|^2 = 1$$

[Formula 8]

$$(\alpha_1 e^{jk\theta_1})^* \beta_1 e^{jk\theta_2} + (\beta_2 e^{jk\theta_3})^* \alpha_2 e^{jk\theta_4} = 0$$

[Formula 9]

In this case, a mark '*' indicates a conjugate complex number. One embodiment of 2×2 phase shift based precoding matrix, which satisfies Formulas 7 to 9, is shown as follows.

$$P_{2\times2}^k = \frac{1}{\sqrt{2}} \begin{pmatrix} 1 & e^{jk\theta_2} \\ e^{jk\theta_3} & 1 \end{pmatrix}$$

[Formula 10]

In Formula 10, the relation shown in Formula 11 exists between $\theta_2$ and $\theta_3$ due to the orthogonality restriction.

$$k\theta_3 = -k\theta_2 + \pi$$

[Formula 11]

Meanwhile, a precoding matrix can be stored as a codebook in a memory of a transmitting and/or receiving end. And, the codebook can be configured to include various precoding matrixes generated through a finite number of different $\theta_2$ values.

In this case, the $\theta_2$ value can be suitably set in accordance with a channel status and a presence or non-presence of feedback information. In case of using feedback information, it is able to obtain a frequency scheduling gain by setting $\theta_2$ small. In case of not using feedback information, it is able to obtain a high frequency diversity gain by setting $\theta_2$ large.

<Second Embodiment>—Generalized Phase Shift Diversity

In the former description, a process for configuring a phase shift based precoding matrix in case of four transmitting antennas with a spatial multiplexing rate 2 has been explained.

Phase shift based precoding can be generalized by the method represented as Formula 12 for a system having $N_t$ transmitting antennas ($N_t$ is a natural number equal to or greater than 2) with a spatial multiplexing rate R (R is a natural number equal to or greater than 1).

In the following description, generalized phase shift based precoding is named generalized phase shift diversity (hereinafter abbreviated GPSD).

$$P_{N_t\times R}^k = \begin{pmatrix} e^{j\theta_1 k} & 0 & \ldots & 0 \\ 0 & e^{j\theta_2 k} & \ldots & 0 \\ \vdots & \vdots & \ddots & 0 \\ 0 & 0 & \ldots & e^{j\theta_{N_t} k} \end{pmatrix} U_{N_t\times R}$$

[Formula 12]

In Formula 12, $P_{N_t}^k \times R$ indicates a GPSD matrix for a $k^{th}$ subcarrier of an MIMO-OFDM signal having $N_t$ transmitting antennas with a spatial multiplexing rate R. The first matrix at the right of an equal sign '=' is a diagonal matrix for phase shift, and the second matrix at the right of an equal sign '=' is a unitary matrix which spreads data symbols of each codeword in spatial domain and it should satisfy the unitary condition as $U_{N_t\times R}^H \times U_{N_t\times R} = I_{R\times R}$ in order not to hurt open-loop channel capacity.

In Formula 12, a phase angle $\theta_i$ (i=1, . . . , $N_t$) can be obtained from Formula 13 in accordance with a delay value $\tau_i$ (i=1, . . . , $N_t$).

$$\theta_i = -2\pi/N_{fft} \cdot \tau_i$$

[Formula 13]

In Formula 13, $N_{fft}$ indicates a number of subcarriers of an OFDM signal.

An example of a GPSD matrix in case of using a 1-bit codebook with two transmitting antennas is shown in Formula 14.

$$P_{2\times2}^k = \left( \begin{array}{|cc|} \alpha & \beta \\ \beta & -\alpha \end{array} \right), \quad \alpha^2 + \beta^2 = 1$$

[Formula 14]

spatial multiplexing rate 1    spatial multiplexing rate 2

In Formula 14, if a value of $\alpha$ is set, a value of $\beta$ is easily determined. So, by setting information about the $\alpha$ value to two kinds of appropriate values, it is able to feed back the corresponding information as a feedback index. For instance, agreement between a transmitter and a receiver can be settled in advance in a manner of setting $\alpha$ to 0.2 if a feedback index is 0 or setting $\alpha$ to 0.8 if a feedback index is 1.

As an example of the second matrix, a prescribed precoding matrix is usable to obtain a signal to noise ratio (SNR) gain. In particular, in case of using Walsh code as the precoding matrix, an example of phase shift based precoding matrix (P) is shown in FIG. 15.

$$P_{4\times4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix}$$

[Formula 15]

$$\begin{pmatrix} 1 & 1 & 1 & 1 \\ 1 & -1 & 1 & -1 \\ 1 & 1 & -1 & -1 \\ 1 & -1 & -1 & 1 \end{pmatrix}$$

Formula 15 assumes a system having four transmitting antennas with a spatial multiplexing rate 4. In this case, by reconfiguring the second matrix appropriately, it is able to select a specific transmitting antenna (antenna selection) or tune a spatial multiplexing rate (rate tuning).

Formula 16 shows a reconfiguration of the second matrix to select two antennas from the system having four transmitting antennas.

$$P_{4\times4}^k = \frac{1}{\sqrt{4}} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 0 & 0 & 1 & 1 \\ 0 & 0 & 1 & -1 \\ 1 & 1 & 0 & 0 \\ 1 & -1 & 0 & 0 \end{pmatrix}$$ [Formula 16]

And, Table 2 shows a method of reconfiguring the second matrix to fit a corresponding multiplexing rate in case that a spatial multiplexing rate varies in accordance with a time or a channel status.

TABLE 2

$$P_{4\times4}^k = \frac{1}{\sqrt{4}} \begin{pmatrix} e^{j\theta_1 k} & 0 & 0 & 0 \\ 0 & e^{j\theta_3 k} & 0 & 0 \\ 0 & 0 & e^{j\theta_2 k} & 0 \\ 0 & 0 & 0 & e^{j\theta_4 k} \end{pmatrix} \begin{pmatrix} \underbrace{1}_{\text{rate 1}} & \overbrace{1 \quad 1}^{\text{rate 4}} & 1 \\ 1 & -1 & 1 & -1 \\ 1 & 1 & -1 & -1 \\ 1 & -1 & -1 & 1 \end{pmatrix}$$

spatial multiplexing rate 2

In Table 2, a case of selecting a first column from the second matrix, a case of selecting first and second columns from the second matrix, and a case of selecting first to fourth columns from the second matrix are shown in accordance with multiplexing rates, respectively. But the present invention is not limited to such a case. Any combination of the first, second, third and fourth columns may be selected and the number of selected columns are according to the multiplexing rate.

Meanwhile, the second matrix can be provided as a codebook in a transmitting end and a receiving end. In this case, index information for a codebook is fed back to the transmitting end from the receiving end. The transmitting end selects a unitary matrix (the second matrix) of a corresponding index from its codebook and then configures a phase shift based precoding matrix using Formula 12.

Moreover, the second matrix can be periodically modified to enable carrier(s) transmitted for a same timeslot to have a different precoding matrix per a frequency band.

Besides, a cyclic delay value for phase shift based precoding is a value preset in a transceiver or a value delivered to a transmitter by a receiver through feedback. And, a spatial multiplexing rate (R) can be a value present in a transmitter/receiver. Alternatively, a receiver periodically obtains a channel status, calculates a spatial multiplexing rate, and then feeds back the spatial multiplexing rate to a transmitter. Alternatively, a transmitter can calculate and modify a spatial multiplexing rate using channel information fed back by a receiver.

An example of a GPSD matrix using 2×2 and 4×4 Walsh codes as a unitary matrix for obtaining GPSD is summarized as Table 3 and Table 4.

TABLE 3

| 2 Tx | |
|---|---|
| Rate 1 | Rate 2 |
| $\frac{1}{\sqrt{2}}\begin{bmatrix} 1 \\ e^{j\theta_1 k} \end{bmatrix}$ | $\frac{1}{\sqrt{2}}\begin{bmatrix} 1 & 1 \\ e^{j\theta_1 k} & -e^{j\theta_1 k} \end{bmatrix}$ |

TABLE 4

| 4 Tx | | |
|---|---|---|
| Rate 1 | Rate 2 | Rate 4 |
| $\frac{1}{2}\begin{bmatrix} 1 \\ e^{j\theta_1 k} \\ e^{j\theta_2 k} \\ e^{j\theta_3 k} \end{bmatrix}$ | $\frac{1}{2}\begin{bmatrix} 1 & 1 \\ e^{j\theta_1 k} & -e^{j\theta_1 k} \\ e^{j\theta_2 k} & e^{j\theta_2 k} \\ e^{j\theta_3 k} & -e^{j\theta_3 k} \end{bmatrix}$ | $\frac{1}{2}\begin{bmatrix} 1 & 1 & 1 & 1 \\ e^{j\theta_1 k} & -e^{j\theta_1 k} & e^{j\theta_1 k} & -e^{j\theta_1 k} \\ e^{j\theta_2 k} & e^{j\theta_2 k} & -e^{j\theta_2 k} & -e^{j\theta_2 k} \\ e^{j\theta_3 k} & -e^{j\theta_3 k} & -e^{j\theta_3 k} & e^{j\theta_3 k} \end{bmatrix}$ |

By the above-explained phase shift based precoding/generalized phase shift diversity according to the first/second embodiment of the present invention, a flat fading channel can be converted to a frequency selectivity channel and a frequency diversity gain or a frequency scheduling gain can be obtained in accordance with a size of a delay sample.

Figure 6:
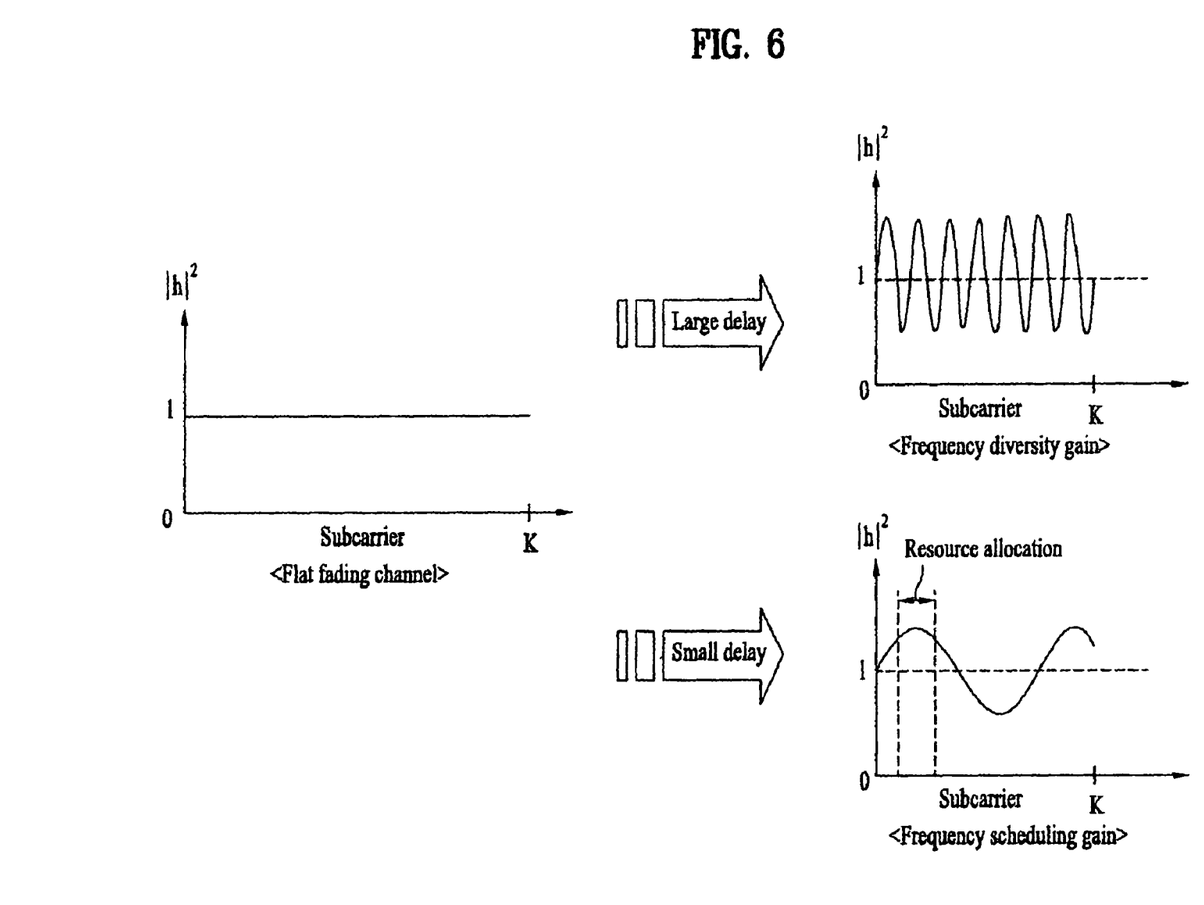
FIG. 6 is a diagram for graphs of two kinds of application examples of phase shift based precoding scheme or phase shift diversity scheme.

FIG. 6 is a diagram for graphs of two kinds of applications of phase shift based precoding and phase shift diversity.

Referring to a right upper part of FIG. 9, in case of using a cyclic delay (or a delay sample) having a large value, a frequency selectivity cycle is increased. Hence, frequency selectivity is raised and a channel code can obtain a frequency diversity gain eventually.

Even if a SNR of a flat fading channel situation is lower than a required SNR for reliable transmission/reception, more robust signal transmission can be provided by increasing frequency selectivity with large delay sampled cyclic delay diversity due to its frequency diversity gain. Hence, it is advantageous that transmission/reception reliability is significantly increased without channel information. This could be employed for an open loop system in which channel information is not available at the transmitter due to fast time update of the channel.

Referring to a right lower part of FIG. 9, in case of using a cyclic delay (or a delay sample) having a small value, a frequency selectivity cycle is slightly increased. So, a closed loop system uses it to obtain a frequency scheduling gain by allocating a frequency resource to an area having a best channel status.

In particular, in case that a phase sequence is generated using a small cyclic delay in applying the phase shift based precoding or the generalized phase shift diversity, a flat fading channel can convert to a frequency selectivity channel to have a channel fluctuation. That is, there can exist a channel size increased part and a channel size deceased part in the frequency selectivity channel converted from a flat fading channel. Hence, a part of subcarrier area of an OFDM symbol increases in channel size, while another part of subcarrier area of the OFDM symbol decreases in channel size.

Referring to the right lower part of FIG. 9, a transmitter is able to obtain frequency diversity effect by assigning a user terminal to a part to have a good channel status due to increased channel strength on a frequency band fluctuating in accordance with a relatively small cyclic delay value. In doing so, in order to apply a uniformly increasing or decreasing cyclic delay value to each antenna, a phase shift based precoding matrix can be used.

In this case, in an OFDMA (orthogonal frequency division multiple access) system accommodating a plurality of users, if a per-user signal is transmitted via a part of frequency band having an increased channel size, a SNR (signal to noise ration) can be raised. And, it frequently happens that a frequency band having an increased channel size differs per a user. So, in an aspect of a system, a multi-user diversity scheduling gain can be obtained. Moreover, since a receiving side simply transmits CQI (channel quality indicator) information of a part enabling each resource allocation of the frequency band for feedback information only, it is advantageous that feedback information is relatively reduced. <Third Embodiment>—Time-Variable Type Generalized Phase Shift Diversity In the GPSD shown in Formula 12, a phase angle ($\theta_i$) and a unitary matrix (U) can be modified in accordance with time variation. And, the time-variable type GPSD can be represented as follows.

$$GPSD_{N_t \times R}^k(t) = \begin{pmatrix} e^{j\theta_1(t)k} & 0 & \cdots & 0 \\ 0 & e^{j\theta_2(t)k} & \cdots & 0 \\ \vdots & \vdots & \ddots & 0 \\ 0 & 0 & 0 & e^{j\theta_{N_t}(t)k} \end{pmatrix}(U_{N_t \times R}(t)) \quad \text{[Formula 17]}$$

In Formula 18a, $GPSD_{N_t \times R}^k(t)$ indicates a GPSD matrix for a $k^{th}$ subcarrier of an MIMO-OFDM signal having $N_t$ transmitting antennas with a spatial multiplexing rate R at a specific time t. And, the first matrix at the right of an equal sign '=' is a diagonal matrix for phase shift, and the second matrix at the right of an equal sign '=' is a unitary matrix which spreads data symbols of each codeword in spatial domain and it should satisfy the unitary condition as $U_{N_t \times R}^H \times U_{N_t \times R} = I_{R \times R}$ in order not to hurt open-loop channel capacity.

In Formula 17, a phase angle $\theta_i(t)$ (i=1, ..., $N_t$) can result in Formula 18 in accordance with a delay value $\tau_i(t)$ (i=1, ..., $N_t$).

$$\theta_i(t) = -2\pi/N_{ft} \cdot \tau_i(t) \quad \text{[Formula 18]}$$

In this case, $N_{ft}$ indicates a number of subcarriers of an OFDM signal.

Referring to Formula 17 and Formula 18, a time delay sample value or a unitary matrix can vary in accordance with lapse of time. In this case, a unit of time can be an OFDM symbol unit or a time of a predetermined unit.

Examples of GPSD matrix, which uses 2×2 or 4×4 Walsh code as an unitary matrix to obtain a time-variable type GPSD, are summarized as follows.

TABLE 5

| 2 Tx | |
|---|---|
| Rate 1 | Rate 2 |
| $\begin{bmatrix} 1 \\ e^{j\theta_1(t)k} \end{bmatrix}$ | $\begin{bmatrix} 1 & 1 \\ e^{j\theta_1(t)k} & -e^{j\theta_1(t)k} \end{bmatrix}$ |

TABLE 6

| 4 Tx | | |
|---|---|---|
| Rate 1 | Rate 2 | Rate 4 |
| $\begin{bmatrix} 1 \\ e^{j\theta_1(t)k} \\ e^{j\theta_2(t)k} \\ e^{j\theta_3(t)k} \end{bmatrix}$ | $\begin{bmatrix} 1 & 1 \\ e^{j\theta_1(t)k} & -e^{j\theta_1(t)k} \\ e^{j\theta_2(t)k} & e^{j\theta_2(t)k} \\ e^{j\theta_3(t)k} & -e^{j\theta_3(t)k} \end{bmatrix}$ | $\begin{bmatrix} 1 & 1 & 1 & 1 \\ e^{j\theta_1(t)k} & -e^{j\theta_1(t)k} & e^{j\theta_1(t)k} & -e^{j\theta_1(t)k} \\ e^{j\theta_2(t)k} & e^{j\theta_2(t)k} & -e^{j\theta_2(t)k} & -e^{j\theta_2(t)k} \\ e^{j\theta_3(t)k} & -e^{j\theta_3(t)k} & -e^{j\theta_3(t)k} & e^{j\theta_3(t)k} \end{bmatrix}$ |

<Fourth Embodiment>—Codebook Based Precoding

The GPSD schemes used in the above-explained embodiments can be used in various ways in accordance with a type of a precoder.

A unitary precoding matrix such as $U_{N_t \times R}$ in Formula 12 or $U_{N_t \times R}(t)$ in Formula 18 can be used in a manner that at least one of precoding matrixes are predetermined in advance by a transmitting end and a receiving end or in a manner that a specific precoding matrix is fed back. The former scheme is called codebook based precoding and represented as follows.

$$\begin{bmatrix} e^{j\theta_1(t)k} & 0 & 0 & 0 \\ 0 & e^{j\theta_2(t)k} & 0 & 0 \\ 0 & 0 & \ddots & 0 \\ 0 & 0 & 0 & e^{j\theta_{N_t}(t)k} \end{bmatrix} \quad \text{[Formula 19]}$$

$$\{[P_{N_t \times R}^1], [P_{N_t \times R}^2], \ldots, [P_{N_t \times R}^{N_c}]\}$$

In Formula 19, $P_{N_t \times R}^n$ (n=1, ..., $N_c$) indicates an $n^{th}$ precoding matrix in a set of precoding matrixes (this is called a codebook). And, $N_c$ precoding matrixes are included in the codebook. The codebook based precoding is applicable in various types as follows.

CODEBOOK BASED PRECODING APPLICATION EXAMPLE 1

This application example 1, in which a phase angle $\theta_i(t)$ (i=1, ..., $N_t$) is used as a fixed value for a predetermined time, relates to a method of selecting to use a precoding matrix within a codebook with a predetermined pattern per a subcarrier or in accordance with a time in an OFDM system.

For explanation of the present application example, Formula 19 can be expressed as follows.

$$\begin{bmatrix} e^{j\theta_1 k} & 0 & 0 & 0 \\ 0 & e^{j\theta_2 k} & 0 & 0 \\ 0 & 0 & \ddots & 0 \\ 0 & 0 & 0 & e^{j\theta_{N_t} k} \end{bmatrix} \{[P_{N_t \times R}^{m_k}]\} \qquad \text{[Formula 20]}$$

In Formula 20, $m_k$ indicates an index of a precoding matrix corresponding to a $k^{th}$ subcarrier and satisfies a condition of $m_k \in \{1, \ldots, N_c\}$. In this case, an index of a subcarrier can be selected according to a previously agreed specific pattern or randomly. Alternatively, an index of precoding matrix can be selected by Formula 21 in which each precoding matrix is cyclically allocated in sub3 or subcarrier index k as follows $$m_k = k \bmod N_c \qquad \text{[Formula 21]}$$

CODEBOOK BASED PRECODING APPLICATION EXAMPLE 2

This application example 2 uses a phase angle $\theta_i(t)$ (i=1, ..., $N_t$) as a fixed value for a predetermined time and also uses a same precoding matrix in an OFDM system for a predetermined time. Yet, in case that a multiplexing rate of a precoding matrix is equal to or greater than 2 (R>1), each column of the fixed precoding can be switched to use according to a previously agreed specific pattern per a subcarrier or in accordance with time.

For explanation of the present application example, Formula 19 can be expressed as follows.

$$\begin{bmatrix} e^{j\theta_1 k} & 0 & 0 & 0 \\ 0 & e^{j\theta_2 k} & 0 & 0 \\ 0 & 0 & \ddots & 0 \\ 0 & 0 & 0 & e^{j\theta_{N_t} k} \end{bmatrix} \{[P_{N_t \times R}^{m,k}(t)]\} \qquad \text{[Formula 22]}$$

In Formula 22, $P_{N_t \times R}^{m,k}$ indicates a transformable $m^{th}$ precoding matrix in a codebook for a $k^{th}$ subcarrier at a specific time t. In case that a multiplexing rate of a corresponding precoding matrix is 2, an exemplary transformation of precoding matrix can be expressed as follows.

TABLE 7

$$P_{N_t \times R}^m = \begin{Bmatrix} p_{1,1} & p_{1,2} \\ p_{2,1} & p_{2,2} \\ \vdots & \vdots \\ p_{N_t,1} & p_{N_t,2} \end{Bmatrix}$$

$$P_{N_t \times R}^{m,k}(t) \in \left\{ \underbrace{\begin{bmatrix} p_{1,1} \\ p_{2,1} \\ \vdots \\ p_{N_t,1} \end{bmatrix} \begin{bmatrix} p_{1,2} \\ p_{2,2} \\ \vdots \\ p_{N_t,2} \end{bmatrix}}_{\text{even subcarrier or time}} \text{or} \underbrace{\begin{bmatrix} p_{1,2} \\ p_{2,2} \\ \vdots \\ p_{N_t,2} \end{bmatrix} \begin{bmatrix} p_{1,1} \\ p_{2,1} \\ \vdots \\ p_{N_t,1} \end{bmatrix}}_{\text{odd subcarrier or time}} \right\}$$

In Table 7, $P_{i,j}$ indicates a precoding weight for a $j^{th}$ transmission symbol transmitted via an $i^{th}$ antenna. In Table 7, it can be confirmed that there are two types generated from switching columns of an $m^{th}$ precoding matrix in accordance with subcarrier k or time t. An exemplary transformation of precoding matrix in case of expanding a spatial multiplexing rate to r can be represented as follows.

TABLE 8

$$P_{N_t \times R}^m = \begin{Bmatrix} p_{1,1} & p_{1,2} & \cdots & p_{1,r} \\ p_{2,1} & p_{2,2} & \cdots & p_{2,r} \\ \vdots & \vdots & \ddots & \vdots \\ p_{N_t,1} & p_{N_t,2} & \cdots & p_{N_t,r} \end{Bmatrix}$$

$$P_{N_t \times R}^{m,k}(t) \in \left\{ \underbrace{\begin{bmatrix} p_{1,1} \\ \vdots \\ p_{N_t,1} \end{bmatrix} \begin{bmatrix} p_{1,2} \\ \vdots \\ p_{N_t,2} \end{bmatrix} \cdots \begin{bmatrix} p_{1,r} \\ \vdots \\ p_{N_t,r} \end{bmatrix}}_{\text{index\_1}}, \underbrace{\begin{bmatrix} p_{1,2} \\ \vdots \\ p_{N_t,2} \end{bmatrix} \begin{bmatrix} p_{1,3} \\ \vdots \\ p_{N_t,3} \end{bmatrix} \cdots \begin{bmatrix} p_{1,1} \\ \vdots \\ p_{N_t,1} \end{bmatrix}}_{\text{index\_2}}, \ldots, \underbrace{\begin{bmatrix} p_{1,r} \\ \vdots \\ p_{N_t,r} \end{bmatrix} \begin{bmatrix} p_{1,1} \\ \vdots \\ p_{N_t,1} \end{bmatrix} \cdots \begin{bmatrix} p_{1,r-1} \\ \vdots \\ p_{N_t,r-1} \end{bmatrix}}_{\text{index\_N}} \right\}$$

Referring to Table 8, a transformation of an $m^{th}$ precoding matrix of a codebook for a $k^{th}$ subcarrier at a specific time t can correspond to one of index__1 to index_N, which can be differently selected per a subcarrier.

Formula 22 can be summarized with contents of Table 7 and Table 8 into Formula 23.

$$\begin{bmatrix} e^{j\theta_1 k} & 0 & 0 & 0 \\ 0 & e^{j\theta_2 k} & 0 & 0 \\ 0 & 0 & \ddots & 0 \\ 0 & 0 & 0 & e^{j\theta_{N_t} k} \end{bmatrix} P_{N_t \times R}^m(t) \Phi_{R \times R}^k \qquad \text{[Formula 23]}$$

In Formula 23, $\Phi^k$ mathematically depicts a column switching scheme of a precoding matrix in Table 7 or Table and can be expressed in accordance with a spatial multiplexing rate as Formula 24.

$$\text{Spatial multiplexing rate 2: } \Phi_{2 \times 2}^k = \begin{pmatrix} 0 & 1 \\ 1 & 0 \end{pmatrix}^k \qquad \text{[Formula 24]}$$

-continued $$\text{Spatial multiplexing rate 3: } \Phi_{3\times 3}^k = \begin{pmatrix} 0 & 1 & 0 \\ 0 & 0 & 1 \\ 1 & 0 & 0 \end{pmatrix}^k$$

$$\text{Spatial multiplexing rate 4: } \Phi_{4\times 4}^k = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^k$$

In addition, a column switching scheme of Formula 24 can be expressed as a different formation with the same characteristics, which is applicable as Formula 25 for example.

[Formula 25]

$\Phi_{R\times R}^k = D(k)U$

| Spatial multiplexing rate R | U | D(k) |
|---|---|---|
| 1 | $[1]$ | $[1]$ |
| 2 | $\begin{bmatrix} 1 & 1 \\ 1 & e^{-j2\pi/2} \end{bmatrix}$ | $\begin{bmatrix} 1 & 0 \\ 0 & e^{-j2\pi k/2} \end{bmatrix}$ |
| 3 | $\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi k/3} & 0 \\ 0 & 0 & e^{-j4\pi k/3} \end{bmatrix}$ |
| 4 | $\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi k/4} & 0 & 0 \\ 0 & 0 & e^{-j4\pi k/4} & 0 \\ 0 & 0 & 0 & e^{-j6\pi k/4} \end{bmatrix}$ |

CODEBOOK BASED PRECODING APPLICATION EXAMPLE 3

This application example 3 uses a phase angle $\theta_i(t)$ (i=1, ..., $N_t$) as a fixed value for a predetermined time and also uses a same precoding matrix for a predetermined time. Yet, by adding a predetermined amount of a phase angle in a phase shift matrix per a subcarrier or in accordance with a time, a frequency diversity gain can be obtained.

For explanation of the present application example, Formula 19 can be expressed as follows.

$$\begin{bmatrix} e^{j\theta_1 k+\phi k} & 0 & 0 & 0 \\ 0 & e^{j\theta_2 k+\phi k} & 0 & 0 \\ 0 & 0 & \ddots & 0 \\ 0 & 0 & 0 & e^{j\theta_{N_t} k+\phi k} \end{bmatrix} \{[P_{N_t \times R}^m(t)]\} \quad \text{[Formula 26]}$$

CODEBOOK BASED PRECODING APPLICATION EXAMPLE 4

This application example 4 uses a phase shift matrix in Formula 19 by switching a row or column position in accordance with a time or a subcarrier of OFDM symbol. Hence, a frequency diversity gain can be obtained.

CODEBOOK BASED PRECODING APPLICATION EXAMPLE 5

This application example 5 is applied to a system that uses a multi-user multi-antenna scheme. In Formula 19, each user (receiving end) feeds back its preferred vector index in a whole precoding matrix of a codebook. A transmitting end generates a precoding matrix by combining the fed-back vector index and then performs precoding using the generated precoding matrix.

To explain the present application example, Formula 17 can be expressed as follows.

$$\begin{bmatrix} e^{j\theta_1(t)k} & 0 & 0 & 0 \\ 0 & e^{j\theta_2(t)k} & 0 & 0 \\ 0 & 0 & \ddots & 0 \\ 0 & 0 & 0 & e^{j\theta_{N_t}(t)k} \end{bmatrix} (P_{N_t \times R}(t)) \quad \text{[Formula 27]}$$

In Formula 27, $P_{N_t \times R}(t)$ indicates a precoding matrix combined through vector index fed back by a single user or several users and may not satisfy a unitary matrix condition. $P_{N_t \times R}(t)$ is represented in detail as follows.

TABLE 9

$$\begin{bmatrix} e^{j\theta_1(t)k} & 0 & 0 & 0 \\ 0 & e^{j\theta_2(t)k} & 0 & 0 \\ 0 & 0 & \ddots & 0 \\ 0 & 0 & 0 & e^{j\theta_{N_t}(t)k} \end{bmatrix}$$

TABLE 9-continued $$\left( \underbrace{\begin{bmatrix} p_{1,1} \\ p_{2,1} \\ \vdots \\ p_{N_t,1} \end{bmatrix}}_{\text{User\_1(t)}} \underbrace{\begin{bmatrix} p_{1,2} \\ p_{2,2} \\ \vdots \\ p_{N_t,2} \end{bmatrix}}_{\text{User\_2(t)}} \cdots \underbrace{\begin{bmatrix} p_{1,r-1} \\ p_{2,r-1} \\ \vdots \\ p_{N_t,r-1} \end{bmatrix} \begin{bmatrix} p_{1,r} \\ p_{2,r} \\ \vdots \\ p_{N_t,r} \end{bmatrix}}_{\text{User\_N(t)}} \right)$$

In Table 9, a phase angle $\theta_i(t)$ (i=1, . . . , $N_t$) can be set in a manner of being modified in accordance with user's mobility. Preferably, the phase angle is set to a small value at a low speed or a large value at a high speed.

Transceiver for Performing Phase Shift Based Precoding

Figure 7:
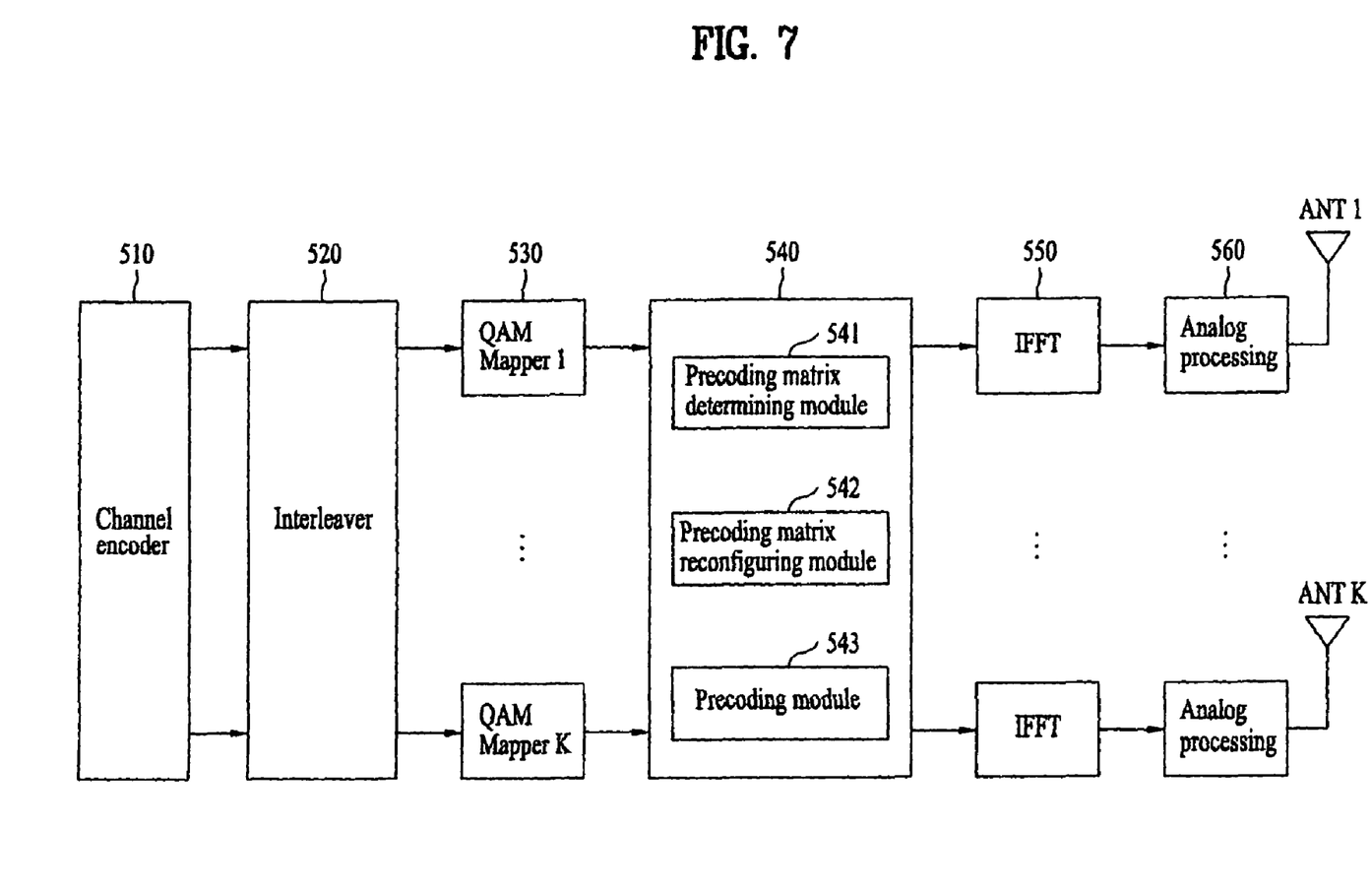
FIG. 7 is a block diagram of SCW OFDM transceiver having a phase shift based precoding scheme applied thereto according to one embodiment of the present invention.
Figure 8:
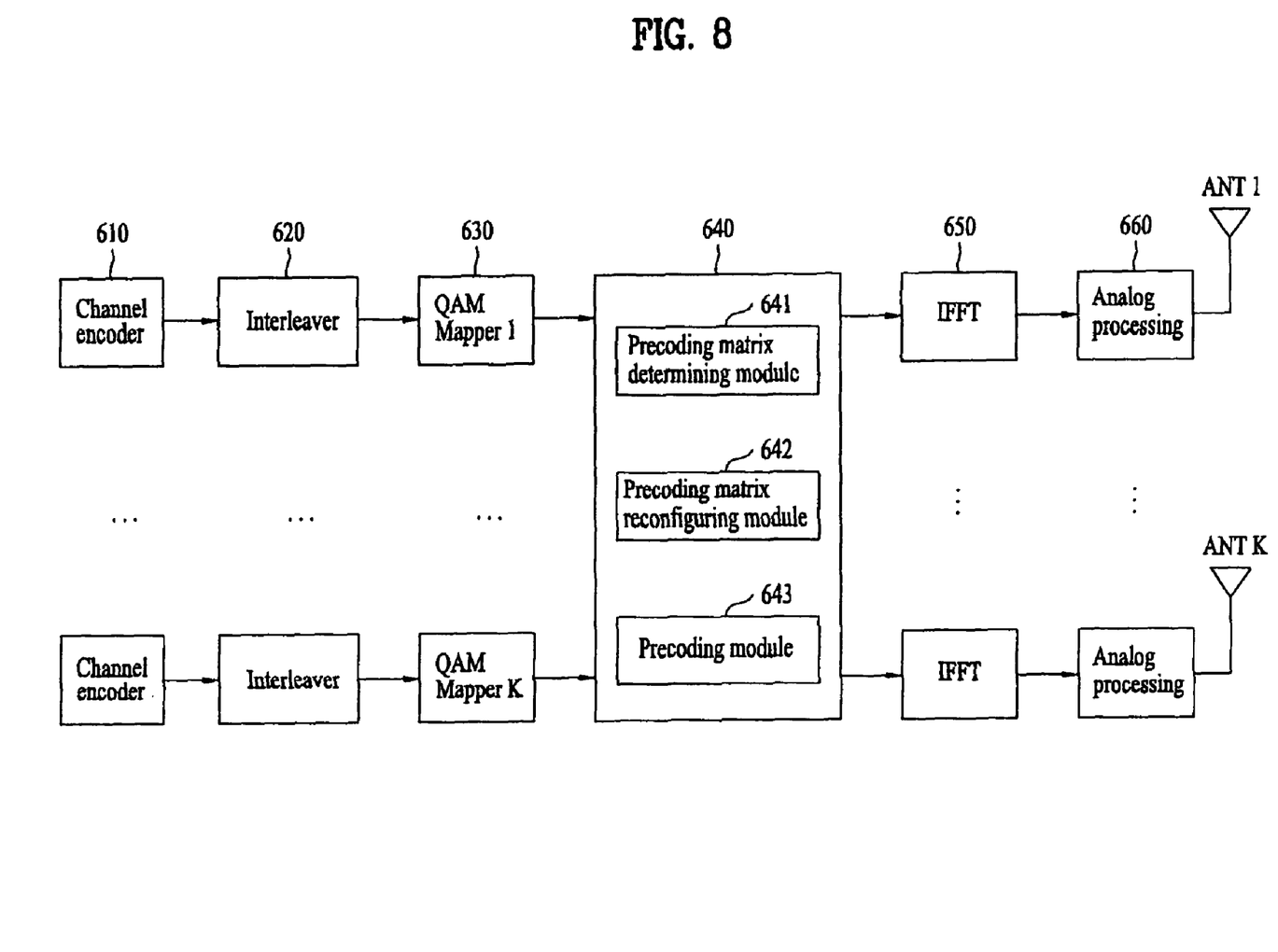
FIG. 8 is a block diagram of MCW OFDM transceiver having a phase shift based precoding scheme applied thereto according to one embodiment of the present invention.

FIG. 7 is a block diagram of SCW OFDM transceiver having a phase shift based precoding scheme applied thereto according to one embodiment of the present invention and FIG. 8 is a block diagram of MCW OFDM transceiver according to one embodiment of the present invention.

Figure 1:
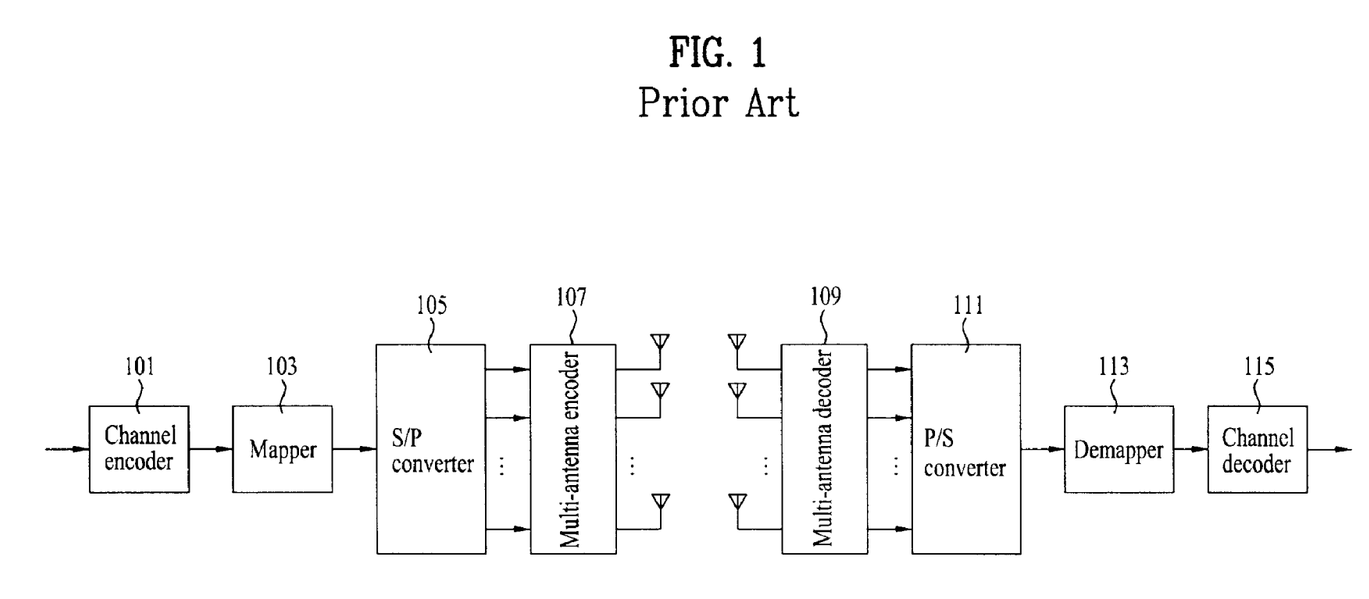
FIG. 1 is a block diagram of an orthogonal frequency division multiplexing system having multiple transmitting and receiving antennas.

Configurations including a channel encoder 510/610, an interleaver 520/620, an IFFT (inverse fast Fourier transform) 550/650, an analog converter 560/660, and the like are equal to those shown in FIG. 1. So, their details are omitted in the following description. And, a precoder 540/640 is explained in detail as follows.

A precoder 540/640 according to the present invention includes a precoding matrix determining module 541/641 and a precoding module 543/643 and may further include a matrix reconfiguring module 542/642.

The precoding matrix determining module 541/641 determines a phase shift based precoding matrix in a manner of multiplying a first matrix as a diagonal matrix for phase shift and a second matrix satisfying a unitary matrix condition together like Formula 13 or Formula 18. In this case, the second matrix can be selected from a codebook in which at least two unitary matrixes are stored. An index of the second matrix can be selected in accordance with a previously agreed specific pattern or randomly. Alternatively an index of the second matrix can be calculated by a modulo operation such as Formula 21.

The matrix reconfiguring module 542/642, if a multiplexing rate of the phase shift based precoding matrix is equal to or greater than 2, reconfigures the phase shift based precoding matrix by switching each column of the phase shift based precoding matrix. And, the matrix reconfiguring module 542/642 can reconfigure the phase shift based precoding matrix in a manner of adding a prescribed offset to a phase angle of the first matrix by a prescribed time unit.

If a second matrix index (precoding index) of the codebook and a column vector are fed back from a plurality of receiving ends, the matrix reconfiguring module 542/642 selects the second matrix of the fed-back index, extracts a column corresponding to the column vector from the corresponding matrix, and the combines the extracted columns to configure a new second matrix. Alternatively, the matrix reconfiguring module 542/642 selects a prescribed number of columns corresponding to a prescribed spatial multiplexing rate from the second matrix and then reconfigures the second matrix including the selected columns only.

The precoding module 543/643 performs precoding in a manner of multiplying each of the determined precoding matrixes by an OFDM symbol for a corresponding subcarrier.

Besides, it is apparent to those skilled in the art that a memory (not shown in the drawings) storing various kinds of setup informations, a receiving circuit (not shown in the drawings) receiving feedback information, a controller (not shown in the drawings) controlling the above-explained elements overall and the like are provided to implement the transceiver according to the present invention.

In particular, a codebook for phase shift based precoding can be stored in the memory. And, the codebook includes at least one phase shift based precoding matrix item and at least one index item for each matrix.

The receiving circuit receives a signal transmitted by a receiver via an antenna, digitalizes the received signal, and then sends the digitalized signal to the controller.

Information extracted from the signal received by the receiving circuit can include channel quality information (CQI). The CQI is the information the receiver feeds back to the transmitter 100 for a coding scheme or a modulation scheme. In particular, the CQI can include at least one of index information on a phase shift based precoding matrix and index information for specifying a specific coding rate and/or a modulation size. And, MCS (modulation and coding scheme) level index can be used as the index information.

INDUSTRIAL APPLICABILITY

Accordingly, the present invention enable efficient communication through a phase shift based precoding scheme that compensates for disadvantages of the related art cyclic delay diversity, phase shift diversity and precoding scheme. In particular, the present invention enables a unitary matrix constructing a phase shift based precoding scheme to be selected or transformed in accordance with various references including a communication situation and the like, thereby enabling optimized communication.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of transmitting data to a receiver by a transmitter using phase shift based precoding in a multiple antenna system using a plurality of subcarriers, the method comprising:
    determining a first matrix of a diagonal matrix for a phase shift as a part of a phase shift based precoding matrix;
    determining a second matrix from a codebook storing at least one unitary matrix as another part of the phase shift based precoding matrix;
    determining the phase shift based precoding matrix by multiplying the first matrix and the second matrix together; and
    performing precoding by multiplying the phase shift based precoding matrix by a symbol of a corresponding one of the subcarriers,
    wherein the second matrix is selected by performing a modulo operation using an index k of the corresponding subcarrier with a codebook size N.

2. The method of claim 1, wherein if a multiplexing rate of the second matrix is equal to or greater than 2, each column of the second matrix is switched by a prescribed time or subcarrier unit.

3. The method of claim 1, wherein a prescribed phase angle is added to the first matrix by the prescribed time or subcarrier unit.

4. The method of claim 1, wherein the second matrix is selected based on information fed back from a plurality of receiving ends.

5. The method of claim 4, wherein the fed-back information comprises information about a matrix index and a column vector within the codebook.

6. A transceiver performing phase shift based precoding, the transceiver transmitting data in a multi-antenna system using a plurality of subcarriers, the transceiver comprising:
a precoding matrix determining module determining a first matrix of a diagonal matrix for a phase shift as a part of a phase shift based precoding matrix, determining a second matrix from a codebook storing at least one unitary matrix as another part of the phase shift based precoding matrix, and determining the phase shift based precoding matrix by multiplying the first matrix and the second matrix together; and
a precoding module performing precoding by multiplying the phase shift based precoding matrix by a symbol of a corresponding one of the subcarriers,
wherein the second matrix is selected by performing a modulo operation using an index k of the corresponding subcarrier with a codebook size N.

7. The transceiver of claim 6, further comprising a precoding matrix reconfiguring module, if a multiplexing rate of the second matrix is equal to or greater than 2, switches each column of the second matrix by a prescribed time or subcarrier unit.

8. The transceiver of claim 6, further comprising a precoding matrix reconfiguring module adding a prescribed phase angle to the first matrix by the prescribed time or subcarrier unit.

9. The transceiver of claim 6, wherein the second matrix is selected based on information fed back from a plurality of receiving ends.

10. The transceiver of claim 9, wherein the fed-back information comprises information about a matrix index and a column vector within the codebook.

* * * * *